(12) United States Patent
Ni

(10) Patent No.: US 8,296,470 B2
(45) Date of Patent: Oct. 23, 2012

(54) NETWORK DEVICE WITH A TRIGGERING ELEMENT THAT OVERWRITES PREDETERMINED NETWORK PARAMETERS

(75) Inventor: Wei Yuan Ni, Shing Tien (TW)

(73) Assignee: Moxa Inc. (TW)

( * ) Notice: Subject to any disclaimer, the term of this patent is extended or adjusted under 35 U.S.C. 154(b) by 500 days.

(21) Appl. No.: 12/507,608

(22) Filed: Jul. 22, 2009

(65) Prior Publication Data

US 2011/0022735 A1    Jan. 27, 2011

(51) Int. Cl.
*G06F 15/16* (2006.01)

(52) U.S. Cl. ............ 710/8; 710/9; 710/10; 710/16; 710/17; 710/18; 710/19; 439/188; 439/676; 709/250

(58) Field of Classification Search .......... 710/8–10, 710/16–19; 439/188, 676; 709/250
See application file for complete search history.

(56) References Cited

U.S. PATENT DOCUMENTS

| | | | |
|---|---|---|---|
| 6,431,892 B1 * | 8/2002 | Shupe et al. | 439/188 |
| 7,611,383 B1 * | 11/2009 | Huang | 439/620.17 |
| 8,011,974 B2 * | 9/2011 | Caveney et al. | 439/676 |

\* cited by examiner

*Primary Examiner* — Tammara Peyton
(74) *Attorney, Agent, or Firm* — Stevens Law Group; David R. Stevens

(57) ABSTRACT

A network device with a triggering element. In a first embodiment where a triggering element is embedded in a network socket, a user is allowed to trigger it to control a processor on the network device to set network parameters. In a second embodiment, the invention can trigger the triggering element to control the processor on the network device. In a third embodiment, the invention sends a triggering signal to the triggering element for controlling electronic elements other than the network device. Therefore, the invention can achieve the effects of network settings of the network device, processor controls, and convenience in controlling other electronic elements.

7 Claims, 8 Drawing Sheets

NETWORK DEVICE WITH A TRIGGERING ELEMENT THAT OVERWRITES PREDETERMINED NETWORK PARAMETERS

BACKGROUND OF THE INVENTION

1. Field of Invention

The invention relates to a network device and, in particular, to a network device with a triggering element that has a triggering element embedded in a network socket to control the processor thereof to perform self controls and network parameter settings.

2. Related Art

Generally speaking, network apparatuses that can communicate with a network have network devices for the connection with the network (e.g., a network card or module). The network device includes a network socket (the so-called communication port) for such connections (e.g., RJ-45 socket) and the storage of various predetermined network parameters (e.g., MAC address, IP address, subnet mask, netmask, etc). Therefore, during operations, packets can be transmitted via the network. When such a network apparatus connects to the network, its user can remotely control to change some of the network parameters via the network so as to suit different network environments.

Due to the rapid developments in network technology, many traditional home electronics and electronic products have been provided with network functions in recent years, forming network apparatuses with network functions such as network fridges, network stereos, etc. They can provide more valued services to users.

However, the user may inadvertently cause damages or errors to the network parameters, so that the network apparatus disconnects from the network and loses the network function. In this case, to repair the broken network connection, one has to correctly reset all the network parameters. Nonetheless, since the network parameters have been damaged or had errors, it is impossible for the user to reset the network parameters remotely according to the above-mentioned method as the network apparatus is disconnected from the network. Instead, one has to open the case of the network apparatus and take out the network module for resetting. For example, the user needs to restore predetermined network parameters by connecting certain pins (e.g., resetting pins) in the network module. This is very inconvenient.

On the other hand, if the network apparatus only has an exposed network socket, it is also impossible to directly control the processor of the network device without taking apart its case. For example, when the user is not using the network, the processor is controlled to stay in the standby state. Therefore, the network apparatus only with an exposed network socket has the problem of no control on its processor.

Moreover, suppose one wants to control other electronic elements in the network apparatus (the electronic elements other than the network device). For example, one may want to control the clock for reducing the working frequency of the processor and saving energy or to control a switch to supply/disconnect the power required by the network apparatus. In such cases, it is still impossible to achieve the goals without taking apart the case of the network apparatus. Therefore, it is a problem not being able to control other electronic elements in the network apparatus.

In summary, the prior art long has the problems that it is inconvenient to reset network parameters when they are damaged or erroneous and that the user cannot directly control the processor and other electronic elements in the network device. It is therefore imperative to provide solutions to these problems.

SUMMARY OF THE INVENTION

In view of the foregoing, the invention discloses a network device with a triggering element.

In a first embodiment, the disclosed network device with a triggering element includes a primary circuit board, a network socket, and a processor. The primary circuit board is disposed with the network socket and the processor, which are electrically connected via the circuit thereon.

The network socket on the primary circuit board includes: a base, a circuit board, and a signal terminal set. The base has a concave part and an accommodating space, with a hole provided at the separation. The circuit board is disposed in the accommodating space and has a triggering element. The triggering element has a triggering terminal set electrically connected with the circuit board and corresponding to the hole. The signal terminal set is disposed in the concave part and electrically connected with the circuit board.

The processor is disposed on the primary circuit board and electrically connected with the triggering terminal set and signal terminal set of the network socket. After the triggering element is triggered, it sends a triggering signal to the processor via the triggering terminal set for controlling the processor to set the network parameters.

In addition to control the processor for network parameter settings via the triggering element as described above, the disclosed network device with a triggering element in a second embodiment can control the processor using the triggering element. It includes a primary circuit board, a network socket, and a processor. The primary circuit board is disposed with the network socket and the processor, which are electrically connected via the circuit thereon.

The network socket is disposed on the primary circuit board and includes a base, a circuit board, and a signal terminal set. The base has a concave part and an accommodating space, with a hole provided at the separation. The circuit board is disposed in the accommodating space and has a triggering element. The triggering element has a triggering terminal set electrically connected with the circuit board and corresponding to the hole. The signal terminal set is disposed in the concave part and electrically connected with the circuit board.

The processor is disposed on the primary circuit board and electrically connected with the triggering terminal set and signal terminal set of the network socket. After the triggering element is triggered, it sends a triggering signal to the processor via the triggering terminal set for controlling the processor.

In a third embodiment, the disclosed network device with a triggering element is disposed in a network apparatus with electronic elements and network device circuit board for controlling the electronic elements using the triggering element. The network device includes a base, a circuit board, and a signal terminal set. The base has a concave part and an accommodating space, with a hole provided at the separation. The circuit board is disposed in the accommodating space and has a triggering element. The triggering element has a triggering terminal set electrically connected with the circuit board and corresponding to the hole. After the triggering element is triggered, it sends a triggering signal to the electronic elements via the triggering terminal set for controlling the electronic elements. The signal terminal set is disposed in the concave part and electrically connected with the circuit board.

The invention differs from the prior art in that a triggering element embedded in the network socket enables the user to control the processor and other electronic elements on the network device by triggering the triggering element.

According to the disclosed techniques, the invention can achieve the goal of setting network parameters of a network device and controlling the processor and other electronic elements thereof.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before explaining the disclosed network device with a triggering element, we first define terms used in this specification. The network apparatus refers to an electronic product with the network function, such as a network phone and network fridge. The network device refers to the device with the network function in the network apparatus, such as a network card or module. The network socket is a socket in the network device for the connection with the network line, such as RJ-45.

Figure 1:
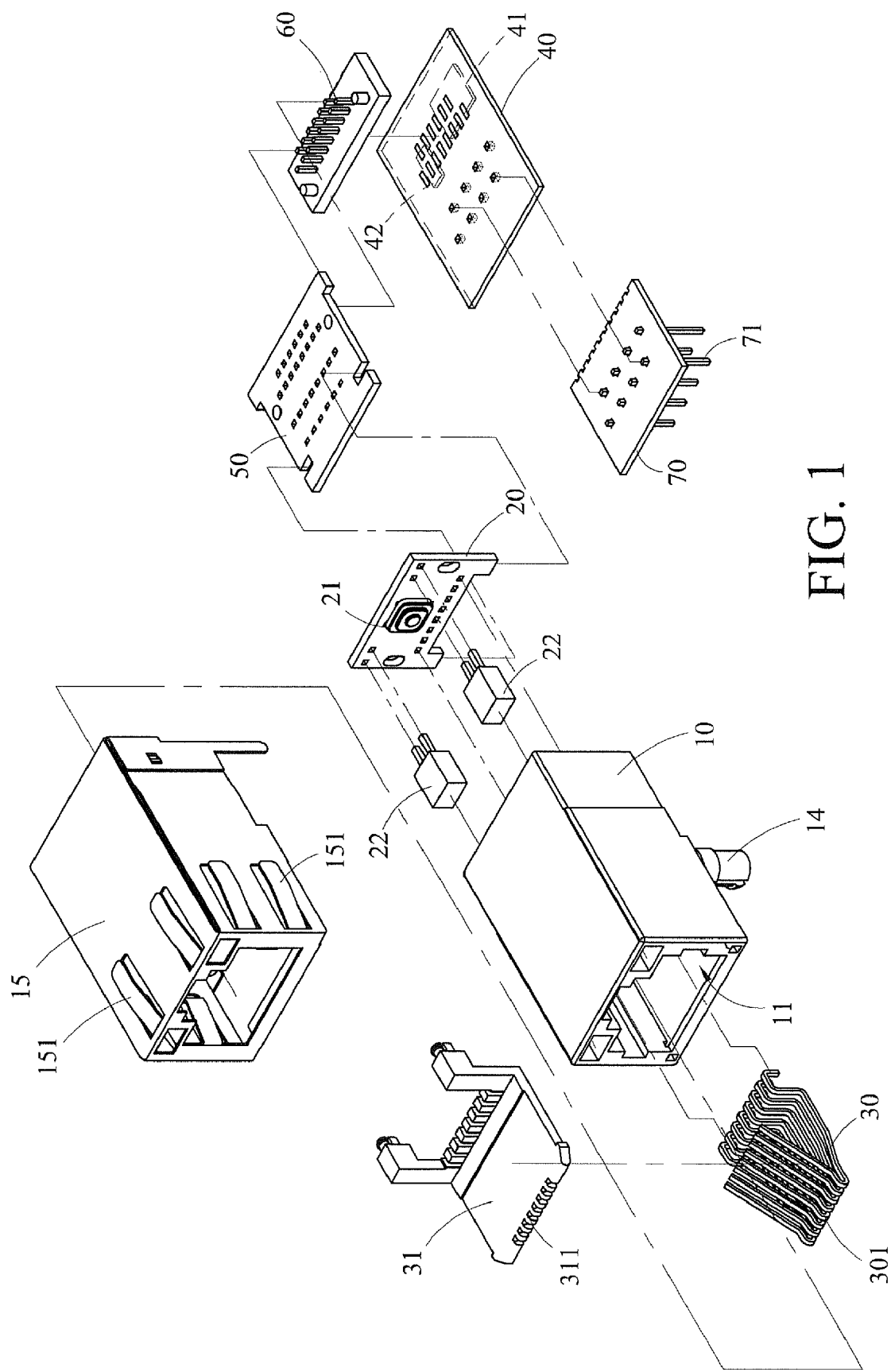
FIG. 1 is a first three-dimensional view of the disclosed network device with a triggering element.

Please refer to FIG. 1 for a three-dimensional exploded view of the disclosed network device with a triggering element. The invention includes: a base 10, a concave part 11 a positioning element 14, a case 15, a ground elastic plate 151, a circuit board 20, a triggering element 21, a light-emitting diode (LED) 22, a signal terminal set 30, a terminal front end 301, a covering board 31, a covering front end 311, a primary circuit board 40, a processor 41, an extension circuit board 50, a pin base 60, a connecting circuit board 70, and pins 71. Please then refer to FIG. 2, which is a three-dimensional view of the base in the disclosed network device with a triggering element. It includes a base 10, an accommodating space 12 and a hole 13.

Figure 2:
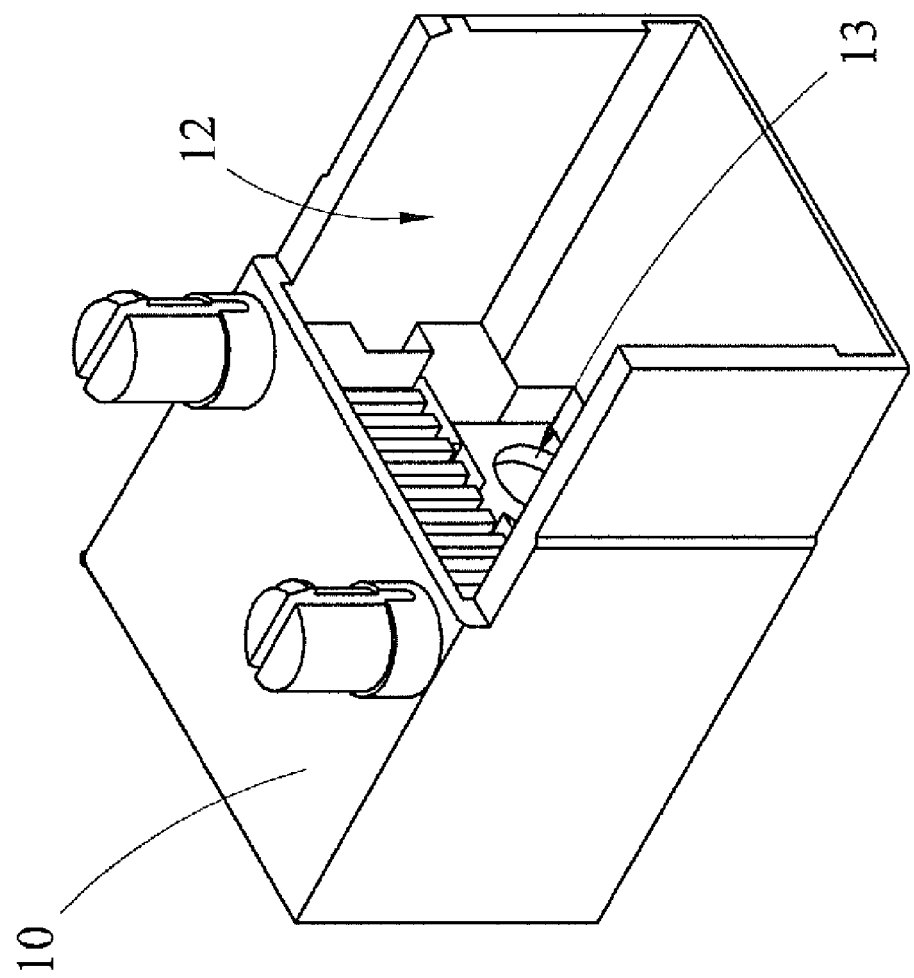
FIG. 2 is a three-dimensional view of the base in the disclosed network device with a triggering element.

The base 10 can be formed by ejection to have the concave part 11 and the base 10 of the accommodating space 12 (see FIG. 2). The accommodating space 12 accommodates the circuit board 20. A hole 13 is formed at the separation between the concave part 11 and the accommodating space 12 (see FIG. 2). In particular, the material of the base 10 can be polyphthalamide (PPA) or some other thermal plastic resins and their compound materials commonly used as the base 10 of the connector. Besides, the base 10 can be further provided with at least one positioning element 14 for fixing the network socket (e.g., RJ-45) on the circuit board (not shown) of the network apparatus. In practice, the relative positions between different positioning elements 14 are used to accurately and rapidly position and fix the base 10.

Besides, the network socket can further include a case 15 which is made of a metal or plastic material (e.g., thermal plastic resin) for enclosing and covering the base 10. The case 15 has at least one ground elastic plate 151 for positioning and grounding when the network socket is installed on the case (not shown) of the network device.

The circuit board 20 is disposed in the accommodating space 12 and has a triggering element 21 (e.g., a button). The triggering element 21 has a triggering terminal set electrically connected with the circuit board 20 and corresponding to the hole 13 (see FIG. 2). It enables the user to trigger from the hole 13 between the concave part 11 and the accommodating space 12. Moreover, the network socket includes at least one LED 22 electrically connected with the circuit board 20. In practice, the LED's 22 can have different colors (e.g., green and orange) to represent different network transmission states of the circuit board 20.

As mentioned before, the base 10 can be formed by ejection to have the concave part 11 and the base 10 of the accommodating space 12 (see FIG. 2). In particular, the concave part 11 is further disposed with a signal terminal set 30. The signal terminal set 30 can be directly embedded in the concave part 11 of the base 10 at the same time of forming the base 10 by ejection. Alternative, the signal terminal set 30 can be put into the concave part 11 after the base 10 is formed by ejection. Afterwards, the signal terminal set 30 is covered by a covering board 31 (as shown in FIG. 1). But the invention is not limited by this example. It is then electrically connected with an RJ-45 socket for signal transmissions.

The covering front end 311 of the covering board 31 is designed to match the shape of the inner side of the signal terminal set 30. The bottom surface of the covering board 31 matches with the shape of the signal terminal set 30. The covering board 31 first tilts an angle so that the covering front end 311 of the covering board is in touch with the inner side of the terminal front end 301 of the signal terminal set 30. The covering board 31 is then rotated so that its bottom surface is in touch with the signal terminal set 30. The signal terminal set 30 is thus disposed in the concave part 11. Using the covering board 31 achieves the effect of embedding the signal terminal set 30 in the base 10.

It should be particularly emphasized that the circuit board in the accommodating space 12 of the base 10 is electrically connected with the primary circuit board 40. Such an electrical connection can be achieved using the extension circuit board 50 and the pin base 60. In practice, the circuit board 20 electrically connects to the extension circuit board 50, and the extension circuit board 50 electrically connects to the primary circuit board 40 via the pin base 60. As a result, the circuit board 20 can transmit the signals of the triggering terminal set and the signal terminal set 30 to the primary circuit board 40. The primary circuit board 40 electrically connects to the processor 41. When the network socket has an LED 22, the terminals of the LED 22 can be electrically connected with the primary circuit board 40 in the same method. Besides, triggering the triggering element 21 on the circuit board 20 can be achieved via the hole 13 of the concave part 11 (e.g., using a tool to depress the triggering element 21).

The primary circuit board 40 has a processor 41. The processor 41 is electrically connected with the triggering terminal set and the signal terminal set 30 of the network socket. In practice, the processor 41 electrically connect with the triggering terminal set and the signal terminal set 30 on the circuit board 20 through the circuit board on the primary circuit board 40 and bus lines. Thus, after the user triggers the triggering element 21, a triggering signal is sent off from the triggering terminal set via the bus line and the circuit on the primary circuit board to the processor 41 for it to perform the corresponding process. Besides, the primary circuit board 40 can further electrically connect to the pins 71 of the connecting circuit board 70, so that the network socket can transmit the signal of the processor 41 via the pins 71 to the electrically connected circuit board (not shown) of the network apparatus. In practice, the pins 71 include GND, Vcc, Reset, RTS, CTS, GPIO, TX, and RX.

Figure 3:
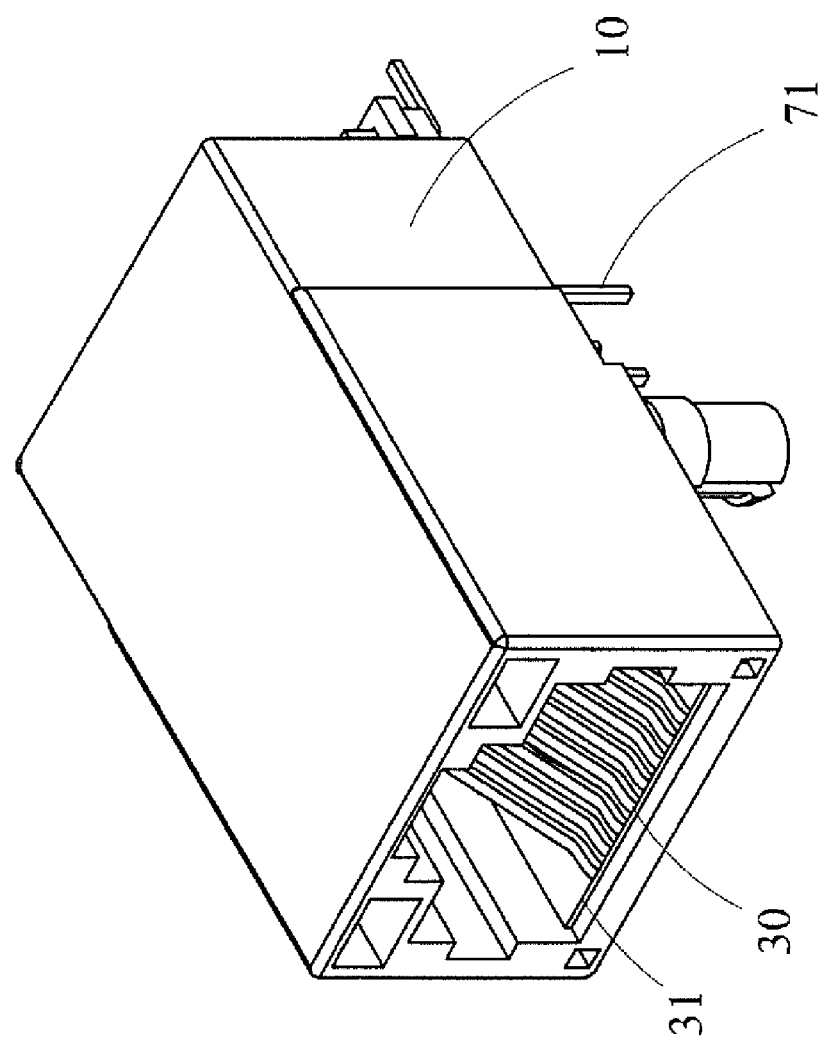
FIG. 3 is a three-dimensional assembly of the disclosed network device with a triggering element.

The three-dimensional view of the assembled network device with a triggering element is shown in FIG. 3. The drawing shows the connection between the covering board 31 and the signal terminal set 30 after the network socket is installed. In practice, the base 10 can be disposed on the circuit board (not shown) of the network apparatus through the positioning elements 14. It is also electrically coupled with the circuit board (not shown) of the network apparatus via the pins 71 of the connecting circuit board 70.

Figure 4:
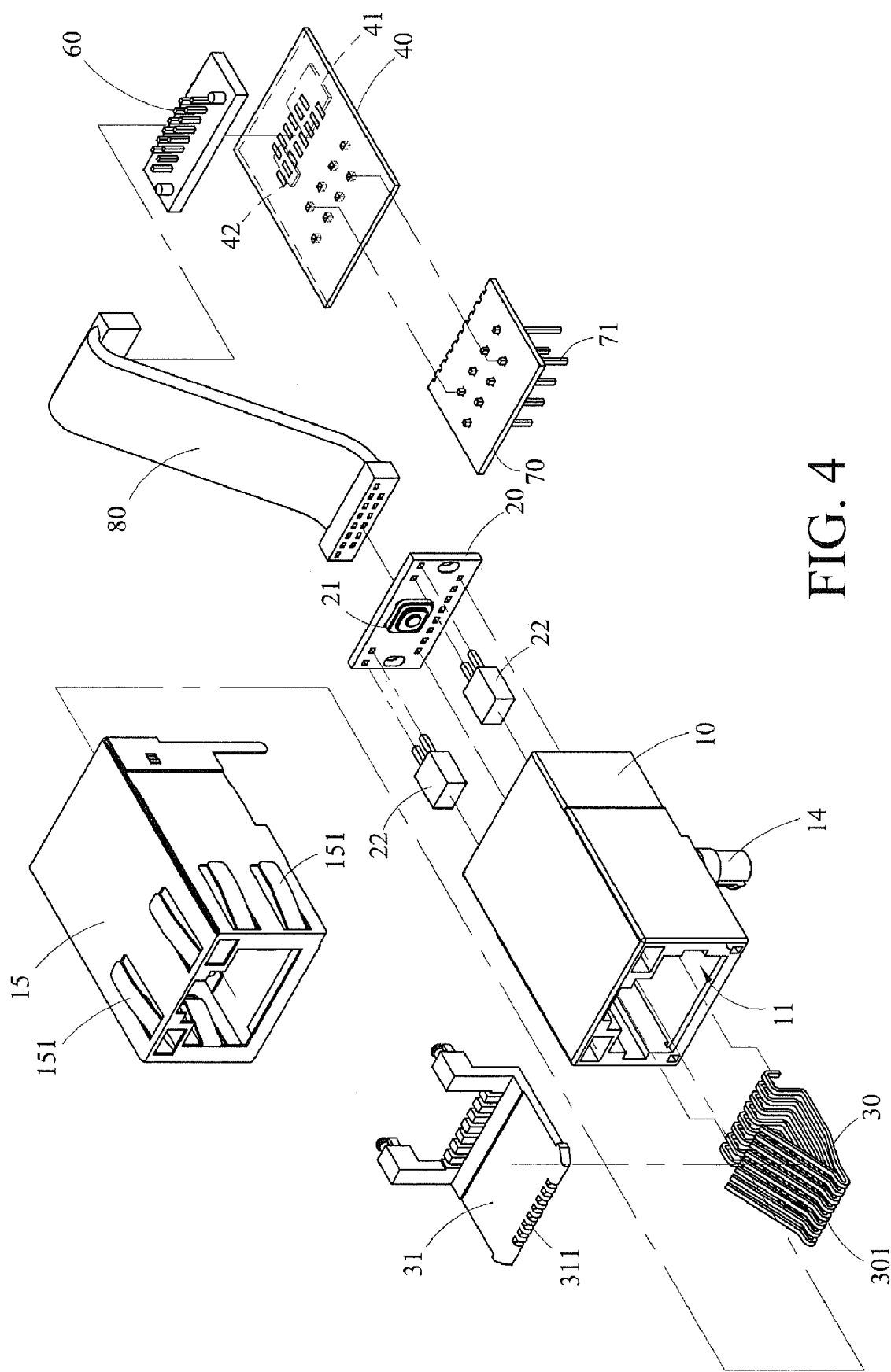
FIG. 4 is a second three-dimensional view of the disclosed network device with a triggering element.

Please refer to FIG. 4 for a second three-dimensional view of the disclosed network device with a triggering element. As mentioned before, the electrical connection between the circuit board 20 and the primary circuit board 40 is achieved with the extension circuit board 50 and the pin base 60. In practice, the electrical connection can be achieved by a bus line 80 as well. The signal of the triggering terminal set and the signal terminal set 30 is then transmitted via the bus line 80 to the primary circuit board 40. It is then electrically coupled with the processor 41 via the circuit embedded in the primary circuit board 40. Since the connections of other elements are the same as those shown in FIG. 1, they are not further described here.

In the first embodiment, the network device follows the triggering signal to control the processor 41 so that the processor 41 can perform network parameter settings. For example, the processor 41 is a system on chip (SoC). The network parameters and predetermined network parameters are stored in the storage module (not shown) of the processor 41. When the processor 41 uses a function, such as 'gpio_read( )', to determine that the GPIO pin of thereof is triggered, then the predetermined network parameters are used to overwrite the network parameters. Since the technique of having a storage module (e.g., flash memory) in the SoC belongs to the prior art, it is further described herein.

The part of storing the network parameters and predetermined network parameters can in practice be implemented using a storage module 42 independent of the processor 41. The storage module 42 is a rewriteable non-volatile memory (e.g., flash memory) for storing the network parameters and predetermined network parameters. In particular, the network parameters are for the user to set, while the predetermined network parameters are a set of network parameters prepared by the manufacturer beforehand. The network parameters and predetermined network parameters include IP address, subnet mask addresses, and gateway addresses. The method of storing the network parameters and the predetermined network parameters is as follows. The storage module 42 is divided into two blocks: one block stores the user defined network parameters, and the other block stores the predetermined network parameters. It should be mentioned that the storage module 42 can be disposed inside the processor 41 or one the primary circuit board 40 as shown in FIG. 1. If it I disposed on the primary circuit board 40, then the storage module 42 and the processor 41 are electrically coupled via the circuit on the primary circuit board 40. When the triggering signal is sent to the processor 41, the processor 41 controls the storage module 42 to overwrite the predetermined network parameters onto the network parameters. In practice, the triggering terminal set is electrically connected with the GPIO pin of the processor 41. When the processor 41 uses the function 'gpio_read( )' to detect that the GPIO pin receives the triggering signal, the processor 41 controls the storage module 42 to overwrite the predetermined network parameters stored in the second block onto the first block as the network parameters. The network parameters of the network apparatus are thus reset to the initial ones. Therefore, if a user carelessly damages, errs, or loses the network parameters, he or she can use the triggering element 21 in the network socket to send a triggering signal for restoring the initial settings.

In the second embodiment, in addition to use the triggering element 21 to control the processor 41 for network parameter settings, the triggering element 21 can be further used to control the processor 41 for other jobs. For example, the processor 41 can use the function 'gpio_read( )' to learn about the state of the GPIO pin thereof, thereby determining whether the triggering element 21 is triggered. After the processor 41 detects that the GPIO pin receives the triggering signal, it adjusts its working frequency. That is, when the user expects that the network load is to increase, it first triggers the triggering element 21 in the network socket, sending a triggering signal to the processor 41 to increase its working frequency (e.g., from the original 100 MHz to 233 MHz). When the user expects that the network will be idle, he can again trigger the triggering element 21 to send another triggering signal to the processor 41. Once the processor 41 detects the triggering signal again, it lowers its working frequency back to the original one, e.g., 100 MHz. Besides, the processor 41 can reset when detecting the triggering signal. Since the techniques of adjusting the working frequency of the processor 41 and performing resets belong to the prior art, they are not further described herein.

As described above, if the triggering element 21 in the network socket is triggered by pressing a function button, the processor 41 can further determine what to do according to the time the triggering signal lasts (i.e., the pressing time of the triggering element 21). Moreover, the LED 22 can notify the user in different illuminating modes. For example, when the pressing time is less than 5 seconds, the LED 22 flashes at a lower rate and the processor 41 performs a reset. When the pressing time is greater than 5 seconds and less than 10 seconds, the LED 22 flashes at a higher rate and the processor 41 restores the initial settings.

Figure 5:
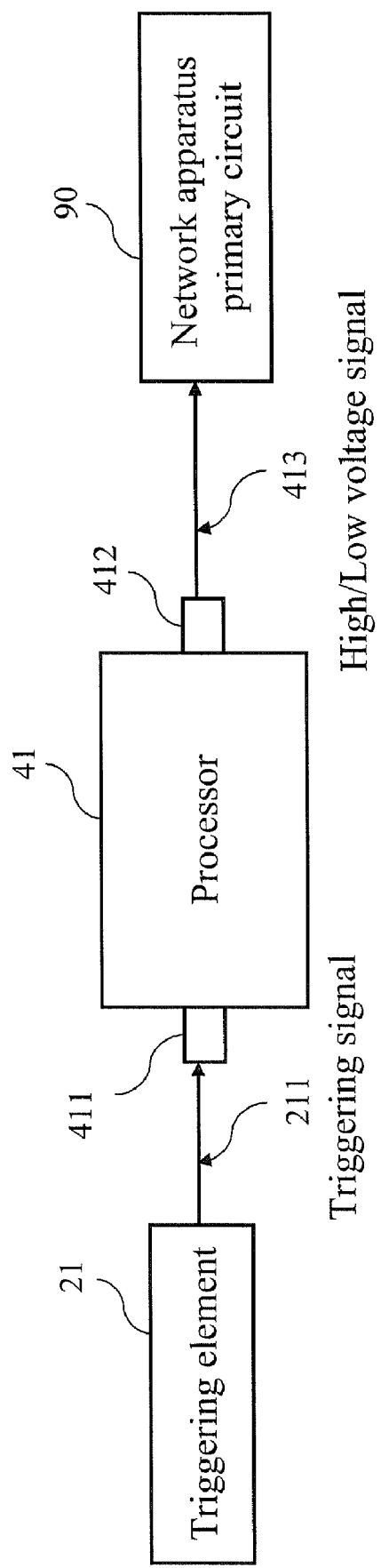
FIG. 5 is a schematic view showing that the GPIO pin of the disclosed processor generates a high/low voltage signal.

Please refer to FIG. 5 that shows how the GPIO pin of the disclosed processor generates a high/low voltage signal. In addition to the example of using the triggering element 21 to control the processor 41, as described above, the processor 41 can have multiple GPIO pins in practice, such as GPIO1, GPIO2, GPIO3, etc. When the GPIO pin 411 of the processor 41 for receiving the triggering signal (e.g., GPIO1) receives the triggering signal, the other GPIO pin 412 (e.g., GPIO2) of the processor 41 generates a high/low voltage signal 413 for output. Through this GPIO pin 412, the high/low voltage signal 413 is output via the pins 71 on the connecting circuit board 70 to a network apparatus primary circuit 90, thereby controlling the network apparatus (i.e., the apparatus that uses the disclosed network device with a triggering element) to perform a corresponding process. For example, the network apparatus follows the high voltage signal output from the GPIO pin 412 to restart the system. Or it follows the high voltage signal to reset the setting parameters stored in the network apparatus to their default values. On the other hand, nothing needs to be done for the low voltage signal. It should be particularly mentioned that the network apparatus primary circuit 90 is located on the circuit board of the network apparatus and electrically connected with the pins 71.

Figure 6:
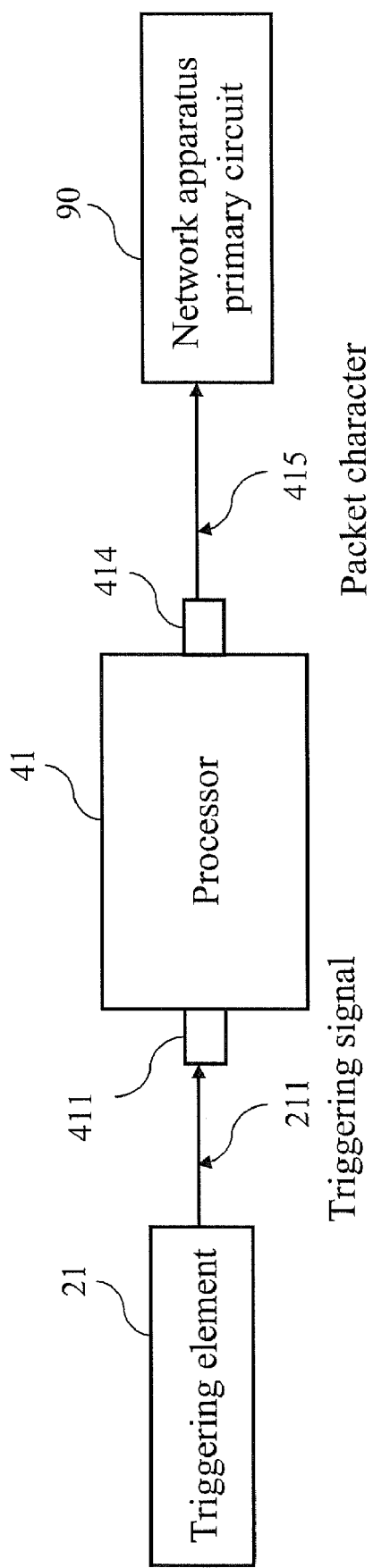
FIG. 6 is a schematic view showing that the disclosed processor generates a packet character and outputs it via the TX pin.

FIG. 6 is a schematic view showing that the disclosed processor generates a packet character and outputs it via the TX pin. As mentioned before, after the processor 41 receives the triggering signal 211 via the GPIO pin 411, it generates a high/low voltage signal 413 at another GPIO pin 412. In practice, in addition to generating the high/low voltage signal 413 at the GPIO pin 412, the processor 41 can further generate a packet character 415 and outputs it via its TX pin 414. The packet character 415 is then output to the network apparatus primary circuit 90 via the pins 71 of the connecting circuit board 70. The network apparatus then performs a corresponding process according to the content of the packet character 415. For example, suppose the content of the packet character 415 is the character 'U', then the network apparatus primary circuit 90 follows the character to restore all setting parameters stored in the network apparatus back to their default values. Since the network apparatus primary circuit 90 belongs to the prior art, it is not further described herein.

Figure 7:
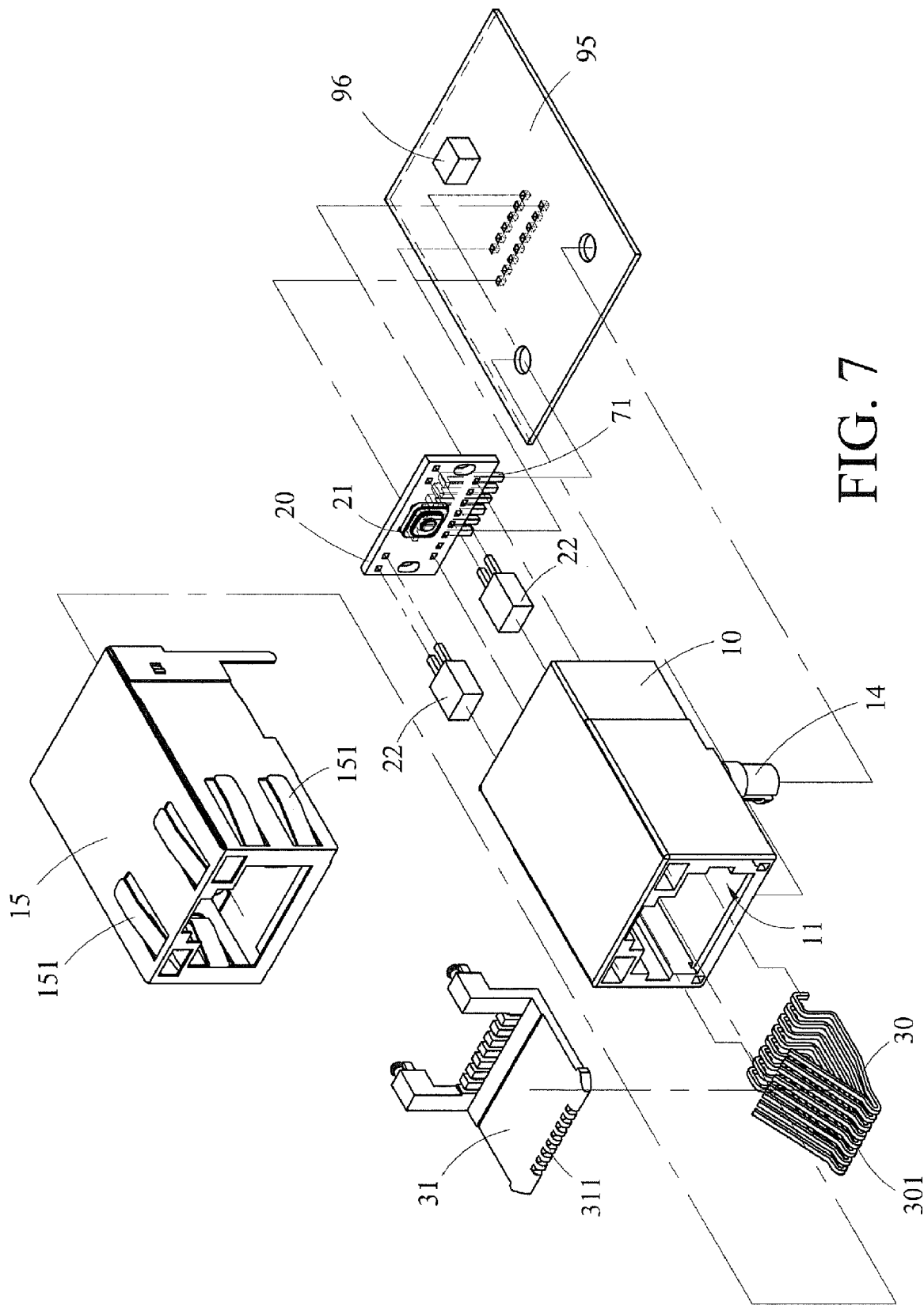
FIG. 7 is a third three-dimensional view of the disclosed network device with a triggering element.

The following paragraphs detail a third embodiment. FIG. 7 is a third three-dimensional view of the disclosed network device with a triggering element. In this embodiment, the disclosed network device is disposed in a network apparatus with an electronic element and a circuit board. The network device includes: a base 10, a circuit board 20, and a signal terminal set 30. The third embodiment is different from the first and second embodiments in that the current embodiment does not have the primary circuit board 40 and the processor 41. The triggering terminal set of the triggering element 21 directly sends out a triggering signal 211 to the electronic element 96 via a set of pins 71 to control the electronic element 96. Moreover, as shown in FIG. 8, the electronic element 96 generates a control signal 97 and transmits it to the network apparatus primary circuit 90 for realizing the goal of controlling the network apparatus.

As described above, the base 10 in the network device has a concave part 11 and an accommodating space 12 (see FIG. 2). The separation between the concave part 11 and the accommodating space 12 has a hole 13 (see FIG. 2). It should be emphasized that the base 10 can have at least one positioning element 14 for fixing the network device on the network apparatus circuit board 95. The network apparatus circuit board 95 is a circuit board in the network apparatus. Since the base 10 is exactly the same as those in the first and second embodiments, it is not further described here.

The circuit board 20 is disposed in the accommodating space 12 and has a triggering element 21. The triggering element 21 has a triggering terminal set electrically connected with the circuit board 20 and corresponding to the hole 13. After the triggering element 21 is triggered, a triggering signal is sent via the triggering terminal set to the electronic element 96 to control it. In practice, the signal terminal set 30 and the triggering terminal set are electrically connected with the circuit board 20 and then to the network apparatus circuit board 95 via the pins 71. The network apparatus circuit board 95 has the electronic element 96 (e.g., processing element, decoding element, switch element, etc). The electronic element 96 can receive the triggering signal and perform the corresponding process (e.g., restarting the network apparatus).

Figure 8:
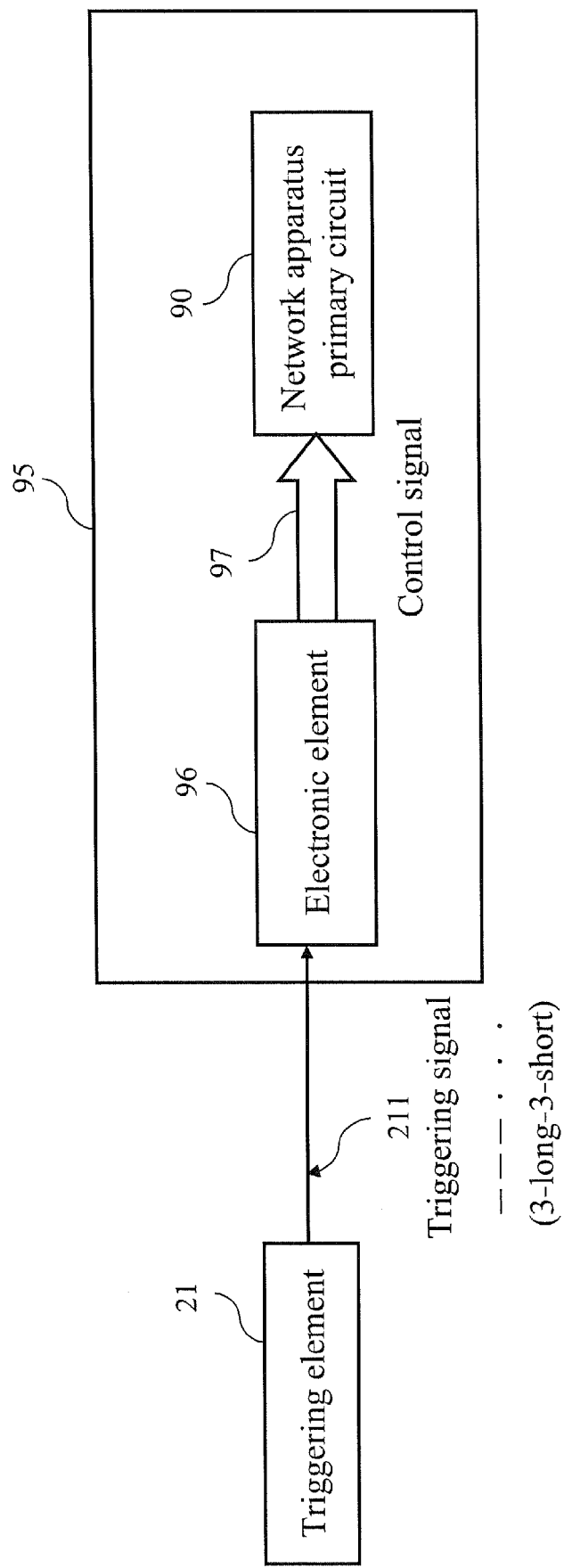
FIG. 8 is a schematic view showing that the invention transmits a triggering signal to some electronic element of the network apparatus.

FIG. 8 shows how the invention transmits the triggering signal to other electronic elements of the network apparatus. As mentioned before, the electronic element 96 can be a processing element, decoding element, or switch element. Moreover, the triggering signal 211 generated by the triggering element 21 can be transmitted to the electronic element 96 on the network apparatus circuit board 95 via the pins 91. Suppose the electronic element 96 is a decoding element. The decoding element continuously receives the triggering signal 211 within a fixed time interval for decoding. For example, suppose the fixed time interval is set as 20 seconds. Then within the 20 seconds, the decoding element continuously receives the triggering signal 211 (e.g., 3-long-3-short signal) generated by pressing the triggering element 21 for decoding and performing the corresponding process. The decoding referred herein is done according to a predetermined correspondence table. The correspondence table records the types of triggering signals 211 (e.g., 3-long-3-short signal) and the corresponding processes to perform. For example, when the decoding element receives a 3-long-3-short triggering signal, it means that the network apparatus needs to be restarted. The 3-long-3-short triggering signal refers to the number of times and time that the triggering element 21 is pressed. In practice, less than 1 second means short and longer than 1 second is long by default. That is, a 3-long-3-short triggering signal is obtained by pressing three times, each of which is longer than 1 second, and then another three times, each of which is shorter than 1 second.

Suppose the electronic element 96 is a decoding element. After the triggering signal 211 is received, the corresponding process is performed according to the predetermined correspondence table (such as restarting the network apparatus). In practice, the process of restarting the network apparatus by the electronic element 96 is achieved by sending a control signal 97 to the network apparatus primary circuit 90. In other words, the user uses the triggering signal 211 generated by the triggering element 21 to control the electronic element 96 in the network apparatus. The controlled electronic element 96 then produces a corresponding control signal 97 and sends it to the network apparatus primary circuit 90 for controlling it.

Suppose the electronic element 96 is a switch element. After the triggering signal 211 sent out from the triggering element 21 is received, the switch element becomes closed or open. In practice, the electronic element 96 can be the power switch of the network apparatus. Besides, the electronic element 96 can also be a processing element for generating a high/low voltage signal at the pin of the processing element after receiving the triggering signal 211. The produced high/low voltage signal is sent to the electrically connected network apparatus primary circuit 90. For example, suppose the processing element has two GPIO pins. After one GPIO receives the triggering signal 211, the other GPIO pin changes from a low voltage signal to a high voltage signal and sends it out to the network apparatus primary circuit 90 for processing.

The signal terminal set 30 is disposed in the concave part 11 and electrically connected with the circuit board 20. Since the signal terminal set 30 is the same as those in the first and second embodiments, it is not further described here.

In summary, the invention differs from the prior art in that the user can use the triggering element 21 embedded in the network socket to control the processor 41 for network parameter settings, directly controlling the processor 41 on the network device, and controlling some other electronic element than the network device. Therefore, the invention enables one to conveniently set network parameters, control the processor 41, and control an electronic element other than the network device. Therefore, it solves the problems in the prior art.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A network device with a triggering element, comprising:
    a primary circuit board;
    a network socket, which is disposed on the primary circuit board and includes:
        a base, which has a concave part and an accommodating space with a hole formed at the separation in between;
        a circuit board, which is disposed in the accommodating space and has a triggering element that has a triggering terminal set electrically connected with the circuit board and corresponding to the hole; and
        a signal terminal set, which is disposed in the concave part and electrically connected with the circuit board;
    a processor, which is disposed on the primary circuit board and electrically connected with the triggering terminal set and the signal terminal set of the network socket; and
    a storage module, which is storing network parameters and predetermined network parameters, the storage module is a rewriteable non-volatile memory within the processor or outside and independent of the processor,
    wherein after the triggering element is triggered, the triggering element transmits a triggering signal via the triggering terminal set to the processor for controlling the processor to perform network parameter settings, when the triggering signal is transmitted to the processor, the processor controls the storage module to overwrite the predetermined network parameters onto the network parameters.

2. The network device with a triggering element of claim 1, wherein the network parameters and the predetermined network parameters include IP addresses, subnet mask addresses, and gateway addresses.

3. The network device with a triggering element of claim 1, wherein the network socket further includes at least one light-emitting diode (LED).

4. The network device with a triggering element of claim 3, wherein the at least one LED electrically connect to the circuit board.

5. The network device with a triggering element of claim 1, wherein the network socket further includes a case to enclose the base, the case being made of a metal or plastic material.

6. The network device with a triggering element of claim 5, wherein the case has at least one ground elastic plate.

7. The network device with a triggering element of claim 1, wherein the circuit board is electrically coupled with the primary circuit board via a bus line/extension circuit board and a pin base.

\* \* \* \* \*